United States Patent [19]
Ando et al.

[11] Patent Number: 4,754,204
[45] Date of Patent: Jun. 28, 1988

[54] DIGITAL APPARATUS FOR CONVERGENCE CORRECTION

[75] Inventors: Naotaka Ando, Saitame; Kazuhiko Takabayashi, Tokyo, both of Japan

[73] Assignee: Sony Corporation, Tokyo, Japan

[21] Appl. No.: 870,742

[22] Filed: Jun. 4, 1986

[30] Foreign Application Priority Data

Jun. 7, 1985 [JP] Japan .................................. 60-123757

[51] Int. Cl.$^4$ ....................... H01J 29/70; H01J 29/72; H04N 11/20
[52] U.S. Cl. .................................... 315/367; 315/368; 358/11
[58] Field of Search .................. 315/367, 368; 358/11, 358/12, 140, 141

[56] References Cited

U.S. PATENT DOCUMENTS 3,714,496  1/1973  Horvath ............................. 315/367
4,401,922  8/1983  Kamata et al. ...................... 315/368

Primary Examiner—Theodore M. Blum
Assistant Examiner—Gregory C. Issing
Attorney, Agent, or Firm—Hill, Van Santen, Steadman & Simpson

[57] ABSTRACT

Digital apparatus for convergence correction of a plurality of images on the screen of a television monitor includes a digital registration circuit, or an analog registration circuit using a digital attenuator; and a memory for storing data for operation of the digital registration circuit or the digital attenuator of the analog registration circuit. The memory has a plurality of pages, and the correction data corresponding to different operating conditions is stored in the respective pages of the memory. The paging of this memory is performed in accordance with the operating conditions, and the convergence correction is carried out on the basis of the correction data continuously read out of the designated page. With this apparatus, accurate convergence adjustment can be simply performed to accommodate changes in size and/or shape of the image displayed on the screen or monitor, changes in the distance of a projection screen from its projector, and changes in the screen surface, i.e., flat, concave, cyindrical, etc.

4 Claims, 5 Drawing Sheets

DIGITAL APPARATUS FOR CONVERGENCE CORRECTION

BACKGROUND

1. Cross Reference To Related Application

The applicant of this invention has filed the application (Ser. No. 775,028 on Sept. 11, 1985) regarding the digital convergence to the U.S. Patent Office prior to this invention. This invention relates to an improvement of this application.

2. Field Of The Invention And Related Art Statement

The present invention relates to a digital convergence apparatus for digitally performing the convergence correction of color television sets (including video monitors and projector-type color television sets).

The convergence correction of color television sets has conventionally been performed by an analog process, using a correction signal derived from the horizontal and vertical deflection signals.

When the screen is large, and with a great and variable distance between the screen and the projector of a projector-type color television set, and when the screen surface is rough, such as in a projector-type color television set of the three-tube type, the allowable range of misconvergence or misregistration is narrow. Thus, a convergence correcting apparatus having a high degree of accuracy has been needed. Therefore, the conventional projector-type color television set, in which the convergence is adjusted by an analog process, is equipped with a plurality of variable controls in order to finely adjust the convergence.

The shape of the projection screen used, for example, with a projector-type color television set of the triple-tube type, affects the required amount of convergence correction according to the receiving standards. The raster shape, which is the ratio of the vertical length to the lateral length (hereinafter, referred to as an aspect ratio) derived by reproducing a video signal of the NTSC system is (3:4). Another aspect ratio is derived by reproducing a video signal of a high quality television set, viz. (3:5). There is still another raster shape in which the aspect ratio is (1:2) corresponding to the cinema scope aspect ratio, and the like. When the screen size or aspect ratio change, the characteristic of the convergence also changes. Therefore, when the size of screen which is projected and/or aspect ratio change, it is necessary to readjust the convergence.

In the case of executing the convergence correction by the analog process, in order to cope with the aspect ratios of various kinds of standards, it has been proposed to use a separate set of manual controls for each different size or shape of screen to be used. For instance, a first control is used when the aspect ratio is (3:4), a second control when the aspect ratio is (3:5), a third control when the aspect ratio is (1:2), and the like. These separate controls are switched as needed, thereby controlling the convergence.

However, in the projector-type color television set, a plurality of controls for the convergence correction are needed with respect to the screen size for each different standard. Thus, if individual controls are used, the number of controls increases by a number which is a multiple of the number of standards to be accomodated. Therefore, a very large number of (e.g., at least thirty to fifty) manual controls are necessary, so that the adjustment becomes fairly complex and difficult, and the circuit scale also increases.

OBJECT AND SUMMARY OF THE INVENTION

It is therefore an object of the present invention to provide a digital apparatus for convergence correction which can execute a highly accuracy convergence adjustment, even if the operating conditions or the standard systems and use conditions should change, meaning the aspect ratio, and the size and/or shape of the projection screen.

Another object of the invention is to provide a digital apparatus for convergence correction in which the circuit scale is not enlarged and the adjustment can be simply carried out.

According to the present invention, there is provided a digital apparatus for convergence correction for digitally performing the convergence correction of a color television set. This apparatus is characterized by a memory having a paging function, and the correction data in accordance with the operating conditions are preliminarily stored into each page of the memory; the pages of the memory are switched in accordance with the standard and use conditions; the convergence correction is carried out on the basis of the correction data in the memory; thereby enabling the accurate convergence adjustment to be executed even if the standard and use conditions change.

According to the invention, the adjustment data corresponding to the standard and use conditions is stored in each page of the memory. The proper page of the memory is designated in accordance with the selected standard and use conditions, and the convergence adjustment is performed using the correction data of the page which is designated.

BRIEF DESCRIPTION OF THE DRAWINGS

The above and other objects, features and advantages of the present invention will be apparent from the following detailed description in conjunction with the accompanying drawings, in which.

DETAILED DESCRIPTION OF THE PREFERRED EMBODIMENT

An illustrative embodiment of the present invention as applied to the projector-type color television set of the triple-tube, will now be described.

Figure 1:
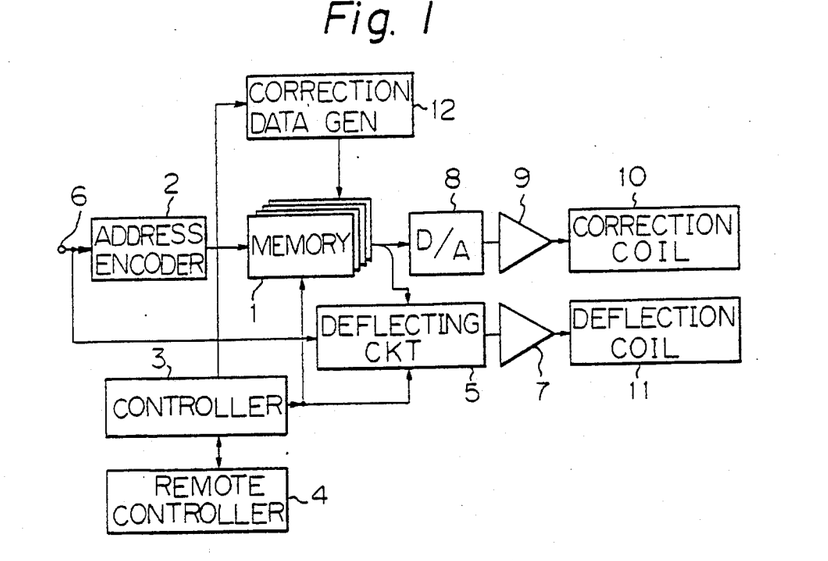
FIG. 1 is a block diagram of an embodiment of the present invention.

In FIG. 1, reference numeral 1 denotes a memory, 2 is an address encoder, and 3 is a controller which is constituted by a microprocessor. The memory 1 is divided into four pages, which are selected, for example, by the upper two bits of the memory address. The correction data for correction of the projection distortion and registration, and the addresses of adjustment points and interpolation points for the screens having different aspect ratios, is preliminarily stored in the respective pages. For instance, the correction data corresponding to the aspect ratio of the screen of a high quality television set is stored in the first page. Similarly, the correction data corresponding to the size and shape of the NTSC system is stored in the second page. The correction data corresponding to the vista size and shape is stored in the third page. The correction data corresponding to the cinema scope size and shape is stored in the fourth page.

When the standard of the screen which is projected by a remote controller 4 is designated, the page address corresponding to this standard is generated from the controller 3. This page address is supplied to the address inputs of the memory 1, and the page of the memory 1 is thereby designated. In addition, the page address is also supplied to a deflecting circuit 5 and the raster size and/or shape is switched in correspondence to the standard of the screen to be projected.

A sync signal to specify the scanning timing of the screen is supplied to a terminal 6. This sync signal is supplied to the address encoder 2 and the addresses of the respective adjustment points and interpolation points are generated from the address encoder 2. The addresses are supplied to the memory 1 and the correction data of the registration and the correction data of the projection distortion of the respective adjustment points and interpolation points in the designation page are read out of the memory 1.

The correction data of the registration read out of the memory 1 is converted into an analog signal by a digital-to-analog (D/A) converter 8 and supplied to a drive amplifier 9. An output of the drive amplifier 9 is supplied to a coil 10 for the registration correction in order to correct misregistration. On the other hand, the correction data regarding the aspect ratio read out of the memory 1 is supplied to the deflecting circuit 5. A digital attenuator within the deflecting circuit 5 regulates the amount of the deflection on the basis of the correction data. An output of the deflecting circuit 5 is supplied to a drive amplifier 7 and an output of the drive amplifier 7 is supplied to a deflection coil 11. Thus, the sizes in the horizontal and vertical directions of the projection screen and its ratio are corrected.

The correction data is written into the memory 1 as follows.

Figure 2:
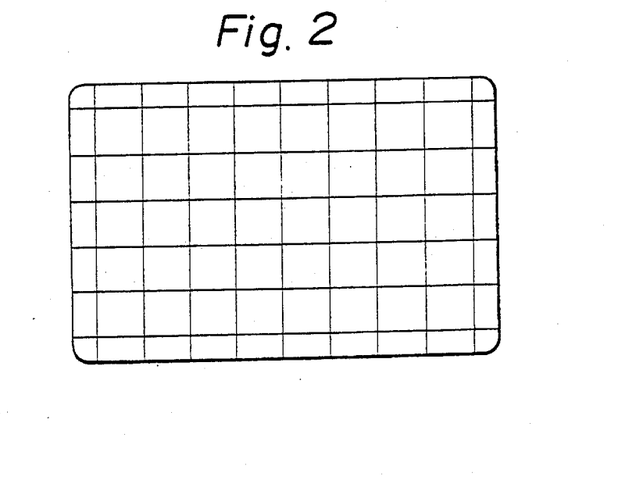
FIG. 2 is a schematic diagram showing an example of a pattern for adjustment.

First, the standard of the screen to be projected is designated by the remote controller 4. Thus, the page of the memory 1 is designated, corresponding to the desired raster size and shape. For example, when the high quality television size is designated, the first page of the memory 1 is designated, and the raster shape is determined such that the aspect ratio becomes (3:5). The controller 3 then enables the first page of the memory 1 for writing, by supplying the appropriate page selecting signals. In this state, as shown in FIG. 2, a cross hatch pattern consisting of, e.g., fifteen vertical lines and fifteen lateral lines, is projected onto the screen for every primary color of R, G and B. The cross points of the cross hatch pattern become the adjustment points.

The address of the adjustment point, i.e., the x, y coordinates of the adjustment point on the screen is designated by the remote controller 4. By operating the remote controller 4, the registration is corrected, by adjusting the data stored in the selected memory page, such that the cross points of the luminance lines of each primary color of this adjustment point mutually coincide. By operating the keys on the remote controller 4, the controller 3 operates the correction data generator 12, and correction data is generated and stored in the memory 1 for each cross point. After completion of the adjustment of the registration, the correction data of the adjustment point remains stored in the memory 1. With respect to the other adjustment points as well, the registration adjustment is performed and the correction data is written into the memory 1 in the manner similar to the above.

With regard to the data for interpolation points, between the adjustment points, the interpolation-data may be derived from the addresses of the adjustment points on the basis of, for instance, the mean values of adjacent points when there are $2^m-1$ interpolation points between adjacent adjustment points, or by use of a formula for calculating interpolation points on a linear basis using the difference between adjacent adjustment points. The data of the interpolation points is written into the addresses of the selected page of the memory 1 for the interpolation. On the other hand, the raster distortion of the whole screen is corrected by controlling the digital attenuator within the deflecting circuit 5, and the size correction data is written into the memory 1.

When the NTSC system is designated, by the remote controller 4, in a manner similar to the case where the high quality television is designated, the address of each adjustment point is designated, and the correction data for registration of this adjustment point, is written into the second page of the memory 1. The correction data for interpolation in the case of the NTSC system, and the correction data for the change raster shape or distortion are also written into the memory 1.

In the manner similar to the above, the vista size and cinema scope size are designated and the correction data in the case of the vista size and cinema scope size and the correction data of the raster distortion are written into the third and fourth pages of the memory 1, respectively.

As described above, the correction data corresponding to the aspect ratios of the screens corresponding to the high quality television size, NTSC system size, vista size, and cinema scope size is written into the first to fourth pages of the memory 1, respectively.

Instead of separately writing the correction data for each point into each page of the memory 1, it is also possible to preliminarily write the same data as the correction data of the high quality television which was first obtained and stored into the first page, for example, into all of the pages and thereafter to adjust the correction data for the other pages as necessary. If the correction data of the first page is written into the other pages as a starting point, a smaller adjustment of the correction data of the other page is needed, and thus can be obtained by adjusting the correction data for the first page until it corresponds to the required correction data for subsequent pages. Thus, the data setting time of the other pages can be reduced.

The case where the aspect ratio of the screen changes has been described in the above embodiment. In addition, the correction data corresponding to the shape of screen (flat screen, concave screen) or the size data of screen may be also written into each page of the memory 1, so that the correct data is available to give proper convergence in any situation.

According to the invention, the correction data corresponding to the standard and use conditions is preliminarily stored into each page of the memory. By paging, the correction data in accordance with the standard and use conditions is read out. Thus, even if the standard and use conditions are changed as well, the accurate convergence adjustment can be promptly performed, by selecting the appropriate page. In addition, since the adjustment is digitally carried out and there is no need to use a number of controls the adjustment is simplified and the circuit scale is not increased.

Figure 3:
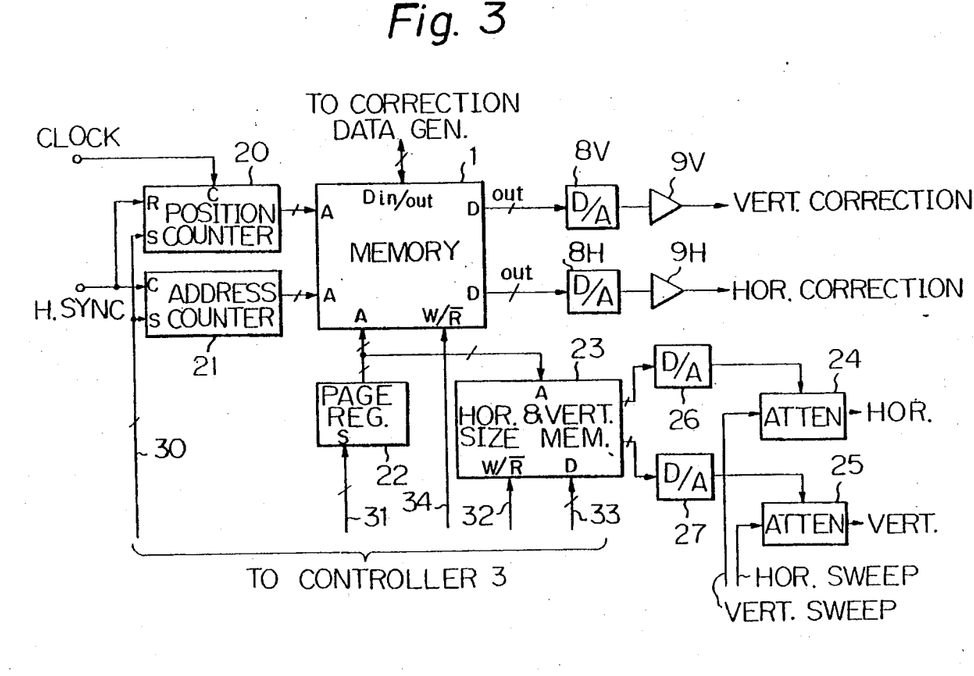
FIG. 3 is a block diagram of a portion of the apparatus of FIG. 1, shown in greater detail.

FIG. 3 illustrates a portion of the appartus shown in FIG. 1 in more detail. Address encoder 2 is made up of a position counter 20 and an address counter 21. The address counter 21 addresses blocks within the memory 1 storing data corresponding to individual video lines of the display, and the position counter 20 addresses plural data cells which store the correction data for several points along each video line. The counter 21 has a radix equal to the number of lines of the video image and is incremented during each cycle of the horizontal sync signal. At the begining of each line, the horizontal sync signal resets the position counter 20. Both counters 20 and 21 can be preset, when necessary, by signals over a bus 30 from the controller 3, so that the controller 3 is able to access the memory 1 for writing new data. The clock and reset inputs to the counters 20 and 21 are disabled (by means not shown) during the presetting by the controller 3, so that the required address can be maintained as long as necessary. The slash on the line 30, as on other lines of FIG. 3, indicates that the line represents a bus with plural parallel lines for the data bits.

FIG. 3 illustrates a separate page register 22 which addresses the highest two bits of the address of the memory 1. It is set by appropriate signals from the controller 3 over the bus 31. A horizontal and vertical size memory 23 is addressed by the output of the page register 22, for supplying digital output signals to the digital analog converters 26 and 27. The converter 26 supplies a control signal to an attenuator 24 which regulates the amplitude of the vertical sweep signal, and the output of the converter 27 furnishes an input to the attenuator 25 which regulates the amplitude of the horizontal sweep. By this means, the horizontal and vertical size of the image being displayed is adjustable in accordance with data stored in the size memory 23. The size memory 23 is connected to receive a control signal from the controller 3 over a line 32, to control the read/write operation, and the data stored in the memory supplied by the controller 3 over the bus 33. It will be understood that if digital attenuators are employed, for the attenuators 24 and 25, the converters 26 and 27 are not needed.

Also shown in FIG. 3 are plural outputs from the memory 1 supplied to digital to analog converters 8V and 8H, for separately controlling correction of the vertical and horizontal deflection. It will be understood that although four separate digital to analog converters are illustrated in FIG. 3, a single converter may be used and its inputs and outputs multiplexed as required, in order to supply the appropriate outputs in response to digital data stored in the memory 1. The memory 1 is controlled by the controller 3 for read/write operations over a control line 34.

Figure 6:
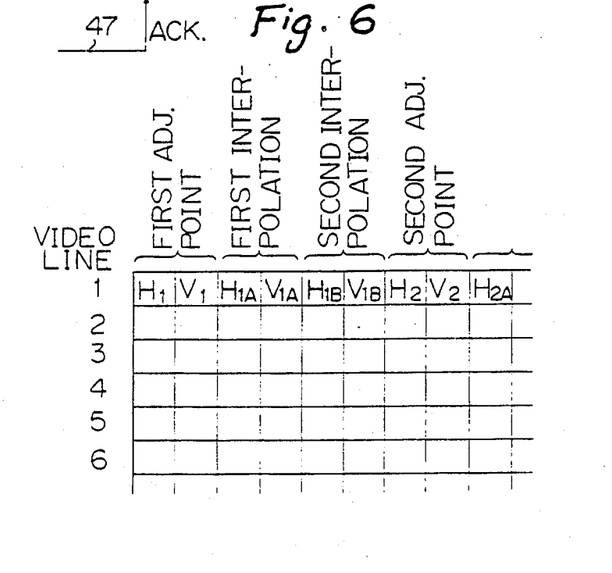
FIG. 6 is a partial memory map of data stored in the page memory.

FIG. 6 illustrates a partial memory map of data stored in the memory 1 in accordance with the present invention. In the map of FIG. 6, each line corresponds to an individual horizontal line of the video image, and each storage location stores a horizontal correction component and a vertical correction component, which are supplied to the converters 8V and 8H (FIG. 3) for generating the vertical and horizontal correction signals respectively. The points H1, V1 and H2, V2, etc., correspond to intersections on the pattern illustrated in FIG. 2, and particularly to the first two intersections of the first line. Two additional interpolation points H1a, V1a and H1b, V1b, are illustrated in FIG. 6, stored in sequential locations between the points H1, V1 and H2, V2. The clock signals applied to the position counter 20 (FIG. 3) are generated with a frequency so that the data for an entire video line (illustrated in FIG. 6) can be read out between successive horizontal sync pulses. In this way continuous vertical and horizontal correction signals are made available through the amplifiers 9V and 9H (FIG. 3).

Since, for any given page, the horizontal and vertical sizes are constant, the size memory 23 is not required to be a high speed memory, nor to have a large storage capacity. Alternatively, the size data can be stored in the memory 1, in storage locations which are referred to either periodically, or on the occasion of a change in the selected page of the memory 1.

Figure 5:
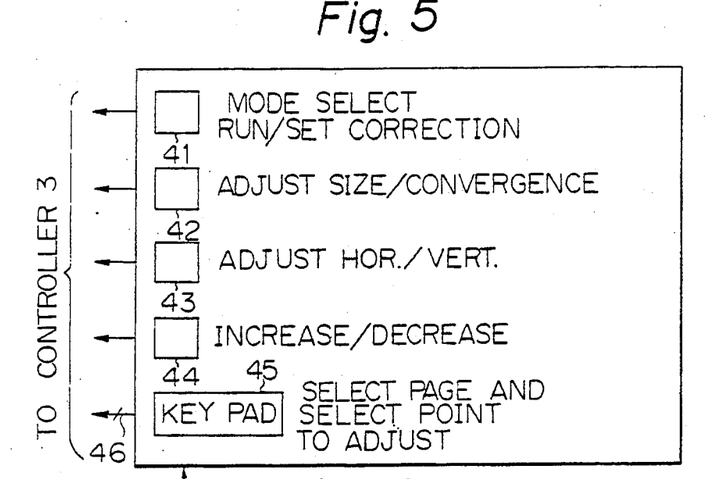
FIG. 5 is a diagramatic view of the remote controller of the apparatus of FIG. 1.

FIG. 5 illustrates a diagramatic view of the remote controller 4. It has a plurality of controls which may be, conveniently, push buttons, for selecting operations to be performed. A control 41 selects the operating mode, which, for successive operations of the control 41, toggles between a run mode, and a set correction mode. In the run mode, the apparatus operates normally, referring to the data stored within the memory 1 for convergence correction on a continuous basis. In the set correction mode, the contents of the memories 1 and 23 may be modified.

Control 42 selects whether the modification is to effect a change in size of the displayed image, or the convergence data. Control 43 selects whether the horizontal or vertical data is to be adjusted, and control 44 indicates whether the stored data is to be increased or decreased. A key pad 45 is provided for allowing entry of numerical data by which a given page may be selected, and by which a given point to adjust may be selected. The key pad 45 supplies a word to the controller 3 over a bus 46, and the other controls described above are connected to the controller 3 over individual lines as shown. A line 47 conveys an acknowledgment signal ACK from the controller to the remote controller to indicate that the command of the remote controller has been received and executed. Preferably, the remote controller 4 is provided with display means (not shown) for indicating the current page number, and the command to be executed next. This command can be sent to the controller 3 by operating the control 3 to select the set mode, and when the controller 3 has executed the appropriate command, the ACK signal on the line 43 effectively toggles the control 41 back to its run condition.

Figures 4, 4A:
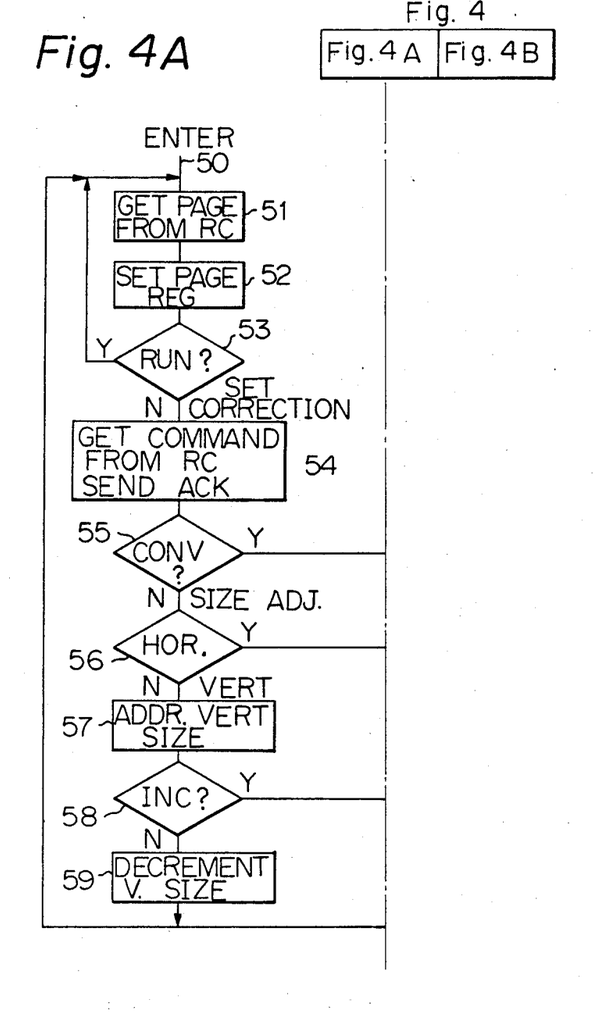
FIG. 4, 4a, and 4b is a flow chart describing operation of the main controller of the apparatus of FIG. 1.
Figure 4B:
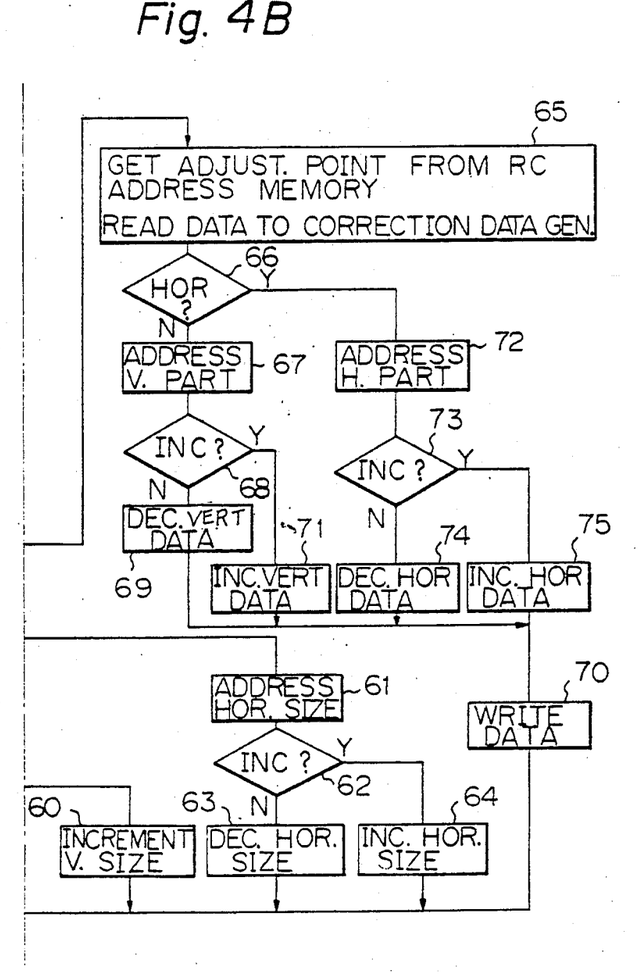

FIG. 4 is a flow chart of operations performed by the controller 3. Preferably the controller 3 is a microprocessor in the form of one of the currently available one chip microprocessors. Alternatively, it may be made up of a number of units for executing the steps indicated in FIG. 4, so as to comprise a "special purpose" processor, which may, if desired be embodied in a signal IC. For that reason, the elements of FIG. 4 will be referred to as units, to imply that the functions of FIG. 4 may be performed by means of programming a conventional microprocessor, or by individual logic units making up the system illustrated in FIGS. 1 and 3.

The sequence of FIG. 4 is entered at point 50, and the unit 51 receives control. The unit 51 gets the page designation from the remote controller (FIG. 5). Then unit 52 sets the page register 22 (FIG. 3) so that the correct data in the memory 1 is being accessed. Unit 53 then determines whether the apparatus is in the run or set mode, and if it is in the run mode, control returns to the entry point 50. In the run mode, the memory 1 is continually accessed for convergence correction data, and the stored data is continuously used to correct the convergence so that the convergence is correct for all the points on the page which is selected.

If the unit 53 determines that the selected mode is the set correction mode, then unit 54 receives control, which causes the controller 3 to get a command from the remote controller 4 and to send the acknowledgment signal which indicates that the command has been received. The ACK signal may be used to modify a portion of the display of the remote controller 4. Unit 55 then receives control and determines whether the command requires an adjustment in the convergence. If not, then the command is for size adjustment and unit 56 receives control. It determines whether the horizontal size is the one to be adjusted. If not, unit 57 receives control, which causes the controller 3 to read in the vertical size data stored for that page in the memory 23, and select the vertical data portion of it. Unit 58 then receives control and determines whether the data is to be incremented. If not, then the data is decremented by unit 59 and rewritten to the memory 23 for subsequent use. Otherwise the unit 60 receives control, and the vertical size data is incremented and then rewritten to the memory 23. In either event, control returns to the entry point 50.

If the unit 56 determines that it is the horizontal component which is to be adjusted, then unit 61 reads the size data from the memory 23 and selects the horizontal data portion of it. Then unit 62 determines whether this data is to be incremented or decremented, after which control is passed to either units 63 or 64, the appropriate actions taken and the data rewritten to the memory 23. In any event, control returns to the entry point 50 to repeat the above described sequence.

In the course of repeated cycles of the sequence, the horizontal and/or vertical size can be adjusted as required and the operator can, by observing the video display, determine when the size data is correct.

If the unit 55 determines that the convergence is to be adjusted, then unit 65 receives control. This unit gets the designation of the adjustment point from the remote controller 4, on the bus 46, and addresses the memory 1 over the bus 30 (FIG. 3), while disabling operation of the address encoding response to the horizontal sync and the clock pulses. The data stored at the selected adjustment point is then read out to the correction data generator, and control is passed to the unit 66. This unit determines whether the command from the remote controller 4 requires an adjustment in the horizontal portion of the data. If not, unit 67 receives control which addresses the vertical part of the data. Then unit 68 determines whether the data is to be incremented. If not, unit 69 decrements the data and passes control to unit 70 which writes the data from the correction data generator into memory, and resumes normal operation of the address encoder including the counters 20 and 21. Then control returns to the entry point 50. If the unit 68 determines that the data is to be incremented, then unit 71 receives control, the data is incremented, and control passes to unit 70, with subsequent operations as described above.

If unit 66 determines that the horizontal data is to be adjusted, then unit 72 receives control which addresses the horizontal part of the data, and passes control to unit 73. Unit 73 determines whether the data is to be incremented or decremented, and passes control to unit 74 or 75, respectively, after which unit 70 receives control in order to write the data to the memory 1. Then the counters 20 and 21 are reenabled and operation continues normally with the modified convergence data being used.

Successive cycles of the operation described above are effective to modify the horizontal and vertical convergence at each point of the grid (FIG. 2) with each respective point identified by means of the key pad 45 (FIG. 5). Preferably, each time the data is written by unit 70, an interpolation is performed for data stored in the interpolation points between successive adjustment points. It will be appreciated that interpolation is preferably carried out on the data stored in the memory 1 each time data is written by units 70, with the updated interpolation data being written to the interpolation points on each side of the adjustment point which is affected by a modification, as a result of a command from the remote controller 4. In the case indicated in FIG. 6, where two interpolation points are provided between adjacent adjustment points, then each interpolation point contains data corresponding to the data stored in its nearest adjustment point, plus $\frac{1}{3}$ of the difference between the data stored in that adjustment point and the next successive adjustment point. This interpolation may be carried out entirely within the controller 3 without the need for a special operator command, using conventional arithmetic techniques, each time the unit 70 receives control. It will be apparent that a greater or lesser number of interpolation points may be provided if desired.

Although a preferred embodiment of the invention has been specifically illustrated and described herein, it will be appreciated that many modifications and variations of the present invention are possible in light of the above teachings and within the preview of the appended claims without departing from the spirit and intended scope of the invention.

What is claimed is:

1. A digital apparatus for convergence correction of a plurality of images on the screen of a television monitor, said screen having one of a plurality of different aspect ratios for each of said plurality of images, comprising:
    a digital registration circuit for controlling the registration of points of said images on said screen on a point-by-point basis,
    a digital paged memory provided for said digital registration circuit for storing digital data corresponding to the registrations of said points,
    and means for selecting one page in accordance with a selected one of said plurality of aspect ratios.

2. Apparatus according to claim 1, wherein said digital registration circuit includes an analog circuit for supplying current to a deflection coil, and a digital attenuator responsive to data stored in said memory, for adjusting the amplitude of said current, thereby to adjust a dimension of the size of said images.

3. Apparatus according to claim 1, wherein said digital registration circuit includes a deflection coil, a correction coil juxtaposed therewith, and means responsive to data stored in said memory for a continous correcting current to said correction coil, in response to data stored in said memory.

4. Apparatus according to claim 1, including means for receiving information corresponding to the scanning speed associated with one of said plurality of aspect ratios, and means for repetitively accessing said digital paged memory at a rate proportional to the scanning speed for the selected aspect ratio.

* * * * *